US012629644B2

(12) United States Patent　　　(10) Patent No.:　US 12,629,644 B2
Steele et al.　　　　　　　　　　　(45) Date of Patent:　　May 19, 2026

(54) STATIC MIXER ASSEMBLIES AND RELATED METHODS OF FABRICATION AND USE

(71) Applicant: Mott Corporation, Farmington, CT (US)

(72) Inventors: James K. Steele, Middlefield, CT (US); Aravind Mohanram, Avon, CT (US)

(73) Assignee: MOTT CORPORATION, Farmington, CT (US)

( * ) Notice: Subject to any disclaimer, the term of this patent is extended or adjusted under 35 U.S.C. 154(b) by 487 days.

(21) Appl. No.: 18/036,447

(22) PCT Filed: Nov. 10, 2021

(86) PCT No.: PCT/US2021/058737
§ 371 (c)(1),
(2) Date: May 11, 2023

(87) PCT Pub. No.: WO2022/103806
PCT Pub. Date: May 19, 2022

(65) Prior Publication Data
US 2023/0415107 A1　　Dec. 28, 2023

Related U.S. Application Data

(60) Provisional application No. 63/112,874, filed on Nov. 12, 2020.

(51) Int. Cl.
*B01F 25/431*　　　(2022.01)
*B29C 64/118*　　　(2017.01)
(Continued)

(52) U.S. Cl.
CPC .......... *B01F 25/431* (2022.01); *B29C 64/118* (2017.08); *B33Y 10/00* (2014.12);
(Continued)

(58) Field of Classification Search
CPC ............ B01F 25/4317; B01F 25/43171; B01F 25/43172
(Continued)

(56) References Cited

U.S. PATENT DOCUMENTS 3,453,811 A　　7/1969　Crowley
3,483,920 A *　12/1969　Heyn et al. ............... F28D 7/08
165/157
(Continued)

FOREIGN PATENT DOCUMENTS

GB　　　2506165 A　　3/2014
JP　　H10216495 A　　8/1998
(Continued)

OTHER PUBLICATIONS

Office Action for the corresponding Japanese Application No. 2023-519985, Date of Drafting: Aug. 13, 2025; 3 pages (English translation).
(Continued)

*Primary Examiner* — David L Sorkin
(74) *Attorney, Agent, or Firm* — CANTOR COLBURN LLP

(57)　　　　ABSTRACT

Disclosed herein are static mixer assemblies, and related methods of fabrication and use. The disclosure provides advantageous static mixer assemblies, and improved systems/methods for utilizing and/or fabricating the static mixer assemblies. The disclosure provides static mixer assemblies fabricated at least in part by additive manufacturing (e.g., via a 3D printing process, such as, for example, via a fused deposition modeling ("FDM") process), and related methods of use. The static mixer assemblies of the present disclosure can be particularly well-suited for applications such as, without limitation, high performance liquid chromatography ("HPLC") applications. The additive manufacturing or 3D
(Continued)

printing processes (e.g., FDM or LAMT techniques) as described herein can be used to manufacture static mixer assemblies with complex shapes/designs (e.g., and that are highly effective yet small in shape).

14 Claims, 13 Drawing Sheets

(51) Int. Cl.

| | |
|---|---|
| *B33Y 10/00* | (2015.01) |
| *B33Y 80/00* | (2015.01) |
| *B29K 71/00* | (2006.01) |
| *B29L 23/00* | (2006.01) |

(52) U.S. Cl.
CPC .......... *B33Y 80/00* (2014.12); *B29K 2071/00* (2013.01); *B29L 2023/00* (2013.01)

(58) Field of Classification Search
USPC ................................................ 366/336–340
See application file for complete search history.

(56) References Cited

U.S. PATENT DOCUMENTS

| | | | | |
|---|---|---|---|---|
| 3,835,886 | A | * | 9/1974 | Zajac ................... F02M 21/045 |
| | | | | 137/896 |
| 4,475,587 | A | * | 10/1984 | Vasiliev ................ F28D 7/0058 |
| | | | | 165/145 |
| 4,582,608 | A | | 4/1986 | Ritacco |
| 4,865,460 | A | | 9/1989 | Friedrich |
| 5,971,603 | A | * | 10/1999 | Davis .................... B01F 25/431 |
| | | | | 366/337 |
| 6,637,928 | B2 | | 10/2003 | Schuchardt |
| 7,325,970 | B2 | | 2/2008 | Keller |
| 7,588,683 | B2 | | 9/2009 | Willis et al. |
| 8,182,132 | B2 | * | 5/2012 | Nagai ..................... B01F 33/81 |
| | | | | 366/147 |
| 8,776,621 | B2 | | 7/2014 | Modic et al. |
| 9,290,372 | B2 | | 3/2016 | Bellqvist et al. |
| 9,597,837 | B1 | | 3/2017 | Cesarano, III et al. |
| 2002/0064087 | A1 | | 5/2002 | Catalfamo et al. |
| 2009/0097352 | A1 | | 4/2009 | Sawada et al. |
| 2011/0049030 | A1 | | 3/2011 | Nickerson et al. |
| 2015/0219604 | A1 | | 8/2015 | Ritchie |
| 2015/0246484 | A1 | | 9/2015 | Hirschberg |
| 2016/0175787 | A1 | | 6/2016 | Merrigan et al. |
| 2018/0056252 | A1 | | 3/2018 | Steele et al. |
| 2019/0232239 | A1 | | 8/2019 | Dunger et al. |

FOREIGN PATENT DOCUMENTS

| | | | |
|---|---|---|---|
| WO | 9608227 | A1 | 3/1996 |
| WO | 2020069227 | A1 | 4/2020 |

OTHER PUBLICATIONS

"Fused filament fabrication"; Wikipedia; https://en.wikipedia.org/wiki/Fused_filament_fabrication#:~:text=Fused%20filament%20fabrication%20(FFF)%2C,filament%20of%20a%20thermoplastic%20material.&text=The%20print%20head%20is%20moved,to%20define%20the%20printed%20shape (retrieved May 10, 2023); 15 pages.

International Search Report for International Application No. PCT/US2017/044562; International Filing Date Jul. 29, 2017; Date of Mailing Jan. 9, 2018; 7 pages.

International Search Report for International Application No. PCT/US2021/058737; International Filing Date Nov. 10, 2021; Date of Mailing Feb. 7, 2022; 2 pages.

Written Opinion for International Application No. PCT/US2017/044562; International Filing Date Jul. 29, 2017; Date of Mailing Jan. 9, 2018; 9 pages.

Written Opinion for International Application No. PCT/US2021/058737; International Filing Date Nov. 10, 2021; Date of Mailing Feb. 7, 2022; 8 pages.

\* cited by examiner

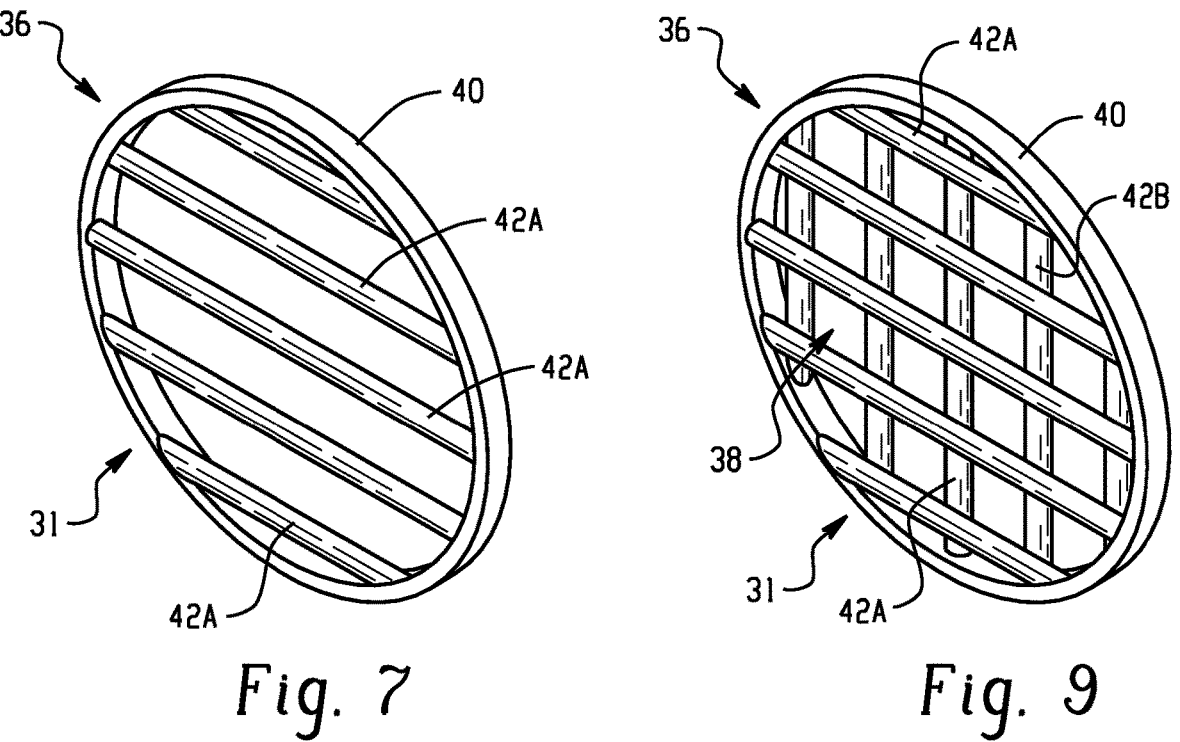
Fig. 7
Fig. 9
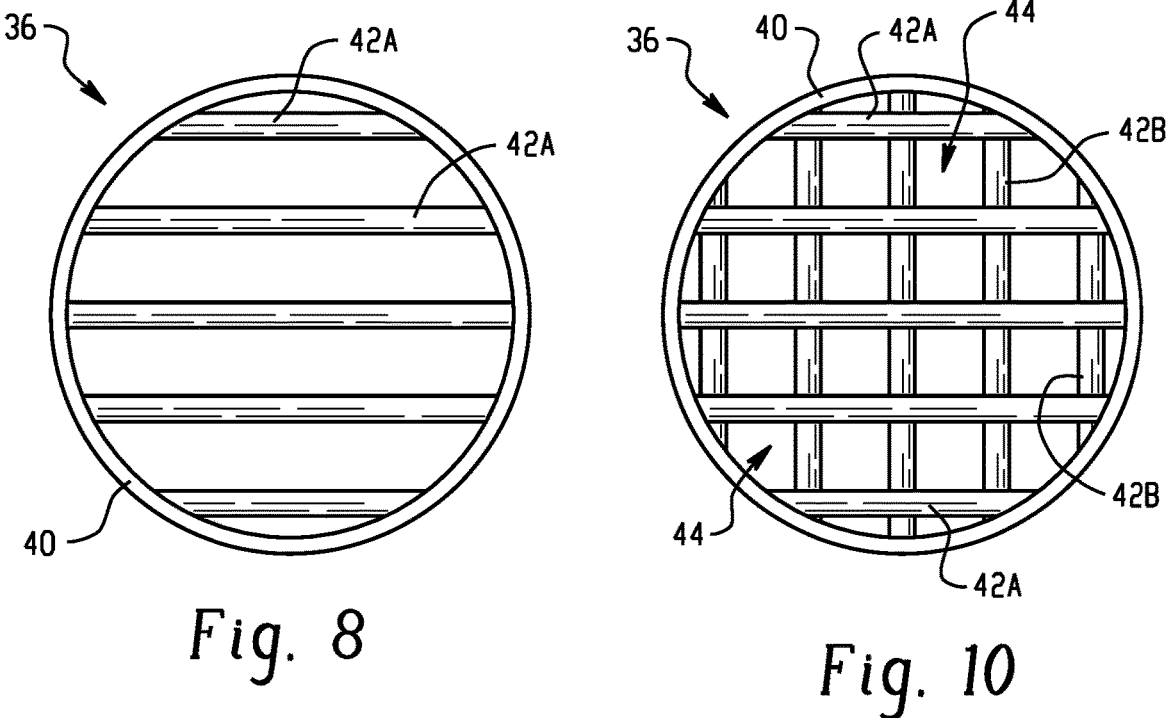
Fig. 8
Fig. 10

12'

12"

12''''

12

15

36

42

36

42

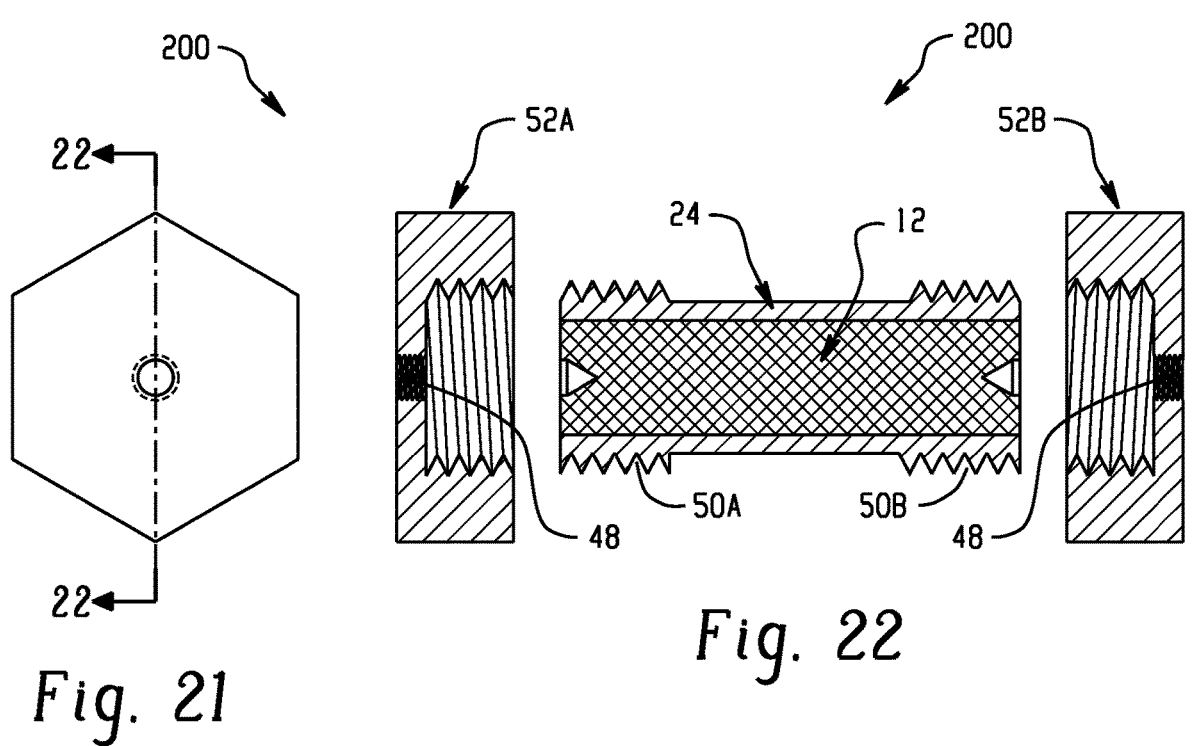
Fig. 21
Fig. 22
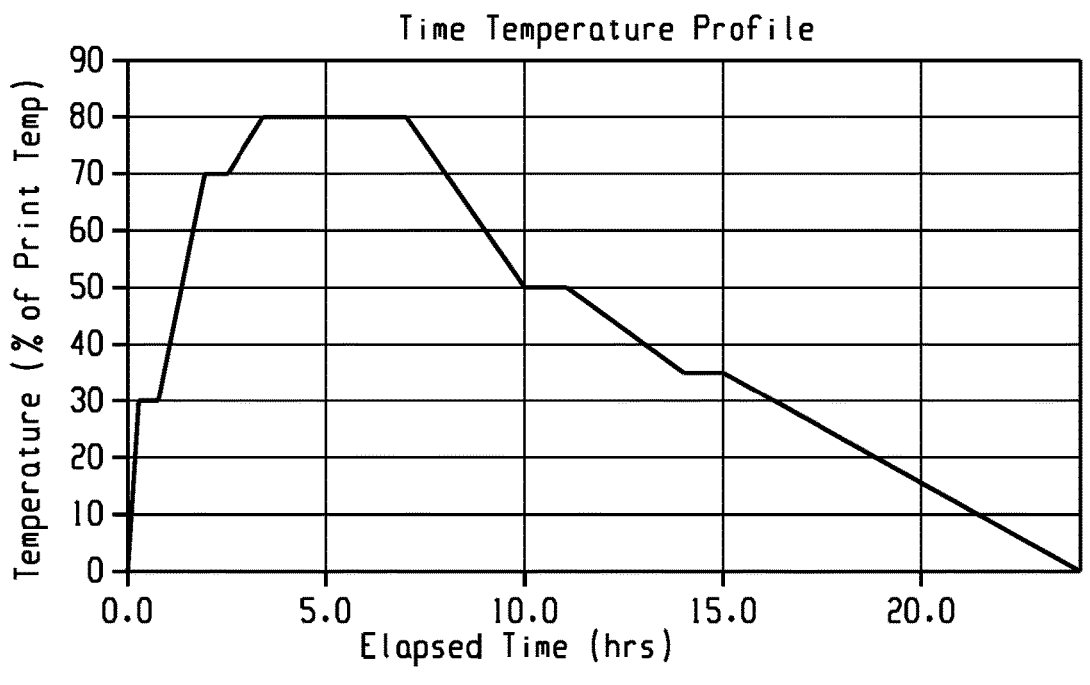
Fig. 23

STATIC MIXER ASSEMBLIES AND RELATED METHODS OF FABRICATION AND USE

CROSS-REFERENCE TO RELATED APPLICATIONS

The present application is a National Stage application of PCT/US2021/058737, filed Nov. 10, 2021, which claims priority benefit to a U.S. Provisional Patent Application which was filed on Nov. 12, 2020, and assigned Ser. No. 63/112,874, the entire contents of which are incorporated herein by reference in their entireties.

FIELD OF THE DISCLOSURE

The present disclosure relates to static mixer assemblies and related methods of fabrication and use and, more particularly, to static mixer assemblies fabricated at least in part by additive manufacturing (e.g., via a 3D printing process, such as, for example, via a fused deposition modeling ("FDM") process).

BACKGROUND OF THE DISCLOSURE

In general, static mixer assemblies are used in varied engineering applications for the continuous mixing, dispersing, reaction, heating and/or cooling of fluid materials. These static mixer assemblies are motionless (hence, "static"), and are typically used as in-line components that work through the energy of the flow stream in which they are employed. For example and without limitation, static mixer assemblies may be used to treat liquids, gases, liquid/solid mixtures and/or supercritical fluids and mixtures thereof with varying viscosities, (pH levels), volumetric flow rates and/or physical properties.

Conventional static mixer assemblies may include one or more mixing elements located within a tubular housing that is placed within the flow path that contains the fluid(s) to be mixed. For example, static mixer assemblies may include a unitary mixing element of a suitable shape, such as an elongated helical structure as described and disclosed in U.S. Pat. No. 7,325,970, which is incorporated by reference herein in its entirety. In other examples, static mixer assemblies can include individual mixing elements stacked in series at varying angles, such as the planar mixing elements described and disclosed in U.S. Pat. No. 6,637,928, which is incorporated by reference herein in its entirety. Other static mixer assemblies are described and disclosed in U.S. Pat. No. 10,661,237, which is incorporated by reference herein in its entirety.

Static mixer assemblies are often used in high performance liquid chromatography ("HPLC") applications. HPLC is a form of column chromatography in which a sample is placed within a solvent and pumped at high pressure (e.g., in excess of 600 Bar) through a column housing or having chromatographic packing material. The sample is carried by a moving carrier fluid stream or mobile phase (and interacts with the packing material, or stationary phase) such that compounds within the sample are separated and can thereafter be identified and quantified. HPLC often makes use of two or more different solvents (as the mobile phase) in which the sample to be analyzed is injected. Because of the desired high precision of HPLC processes, the solvents should be thoroughly and homogenously mixed for maximum instrument performance (e.g., these solvents may be mixed in gradients to improve the throughput of the process by changing the affinity levels of the sample constituents to the mobile phase). For example, incomplete solvent mixing may result in degradation of the HPLC chromatogram, in turn resulting in excessive baseline noise (e.g., as manifested by a periodic ripple of the detector signal versus time) and/or poor peak shapes (e.g., as manifested by broad and/or asymmetrical peak widths). Wetted path materials of these mixers can play an important role in both the binding and reactivity of the sample. In general, inert wetted materials can be preferred to reduce interactions with the sample for more accurate readouts by downstream detectors.

An interest exists for improved static mixer assemblies and related methods of fabrication and use.

These and other inefficiencies and opportunities for improvement are addressed and/or overcome by the assemblies, systems and methods of the present disclosure.

BRIEF SUMMARY OF THE DISCLOSURE

The present disclosure provides advantageous static mixer assemblies, and improved systems/methods for utilizing and/or fabricating the static mixer assemblies. More particularly, the present disclosure provides static mixer assemblies fabricated at least in part by additive manufacturing (e.g., via a 3D printing process, such as, for example, via a FDM process), and related methods of use.

The present disclosure provides for a static mixer assembly including a mixer body that extends from a first end to a second end, the first end having a first opening and the second end having a second opening, the mixer body including a first end member, a mixer portion, and a second end member, with the mixer portion having an internal mixer section; the first opening extending inward toward the mixer portion and in fluid communication with a first flow channel, and the second opening extending inward toward the mixer portion and in fluid communication with a second flow channel; the first flow channel extending from the first opening to a first manifold positioned proximal to a first end of the internal mixer section and the second flow channel extending from the second opening to a second manifold positioned proximal to a second end of the internal mixer section; the internal mixer section defining a lumen having an outer wall; and a first, a second and a third plurality of grid members positioned in the lumen, with the grid members of the first, second and third plurality of grid members each extending across the lumen from one side of the outer wall to another side of the outer wall; and wherein the first and third plurality of grid members are positioned or oriented the same way across the lumen, thereby creating longitudinal mixing channels and transverse openings in the lumen relative to the first, second and third plurality of grid members.

The present disclosure also provides for a method for fabricating a static mixer assembly including providing a mixer body that extends from a first end to a second end, the first end having a first opening and the second end having a second opening, the mixer body including a first end member, a mixer portion, and a second end member, with the mixer portion having an internal mixer section; the first opening extending inward toward the mixer portion and in fluid communication with a first flow channel, and the second opening extending inward toward the mixer portion and in fluid communication with a second flow channel; the first flow channel extending from the first opening to a first manifold positioned proximal to a first end of the internal mixer section and the second flow channel extending from the second opening to a second manifold positioned proximal to a second end of the internal mixer section; the internal mixer section defining a lumen having an outer wall; and positioning a first, a second and a third plurality of grid members in the lumen, with the grid members of the first, second and third plurality of grid members each extending across the lumen from one side of the outer wall to another side of the outer wall; and wherein the first and third plurality of grid members are positioned or oriented the same way across the lumen, thereby creating longitudinal mixing channels and transverse openings in the lumen relative to the first, second and third plurality of grid members.

The above described and other features are exemplified by the following figures and detailed description.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are exemplary embodiments wherein the like elements are numbered alike.

Features and aspects of embodiments are described below with reference to the accompanying drawings, in which elements are not necessarily depicted to scale.

Figure 1:
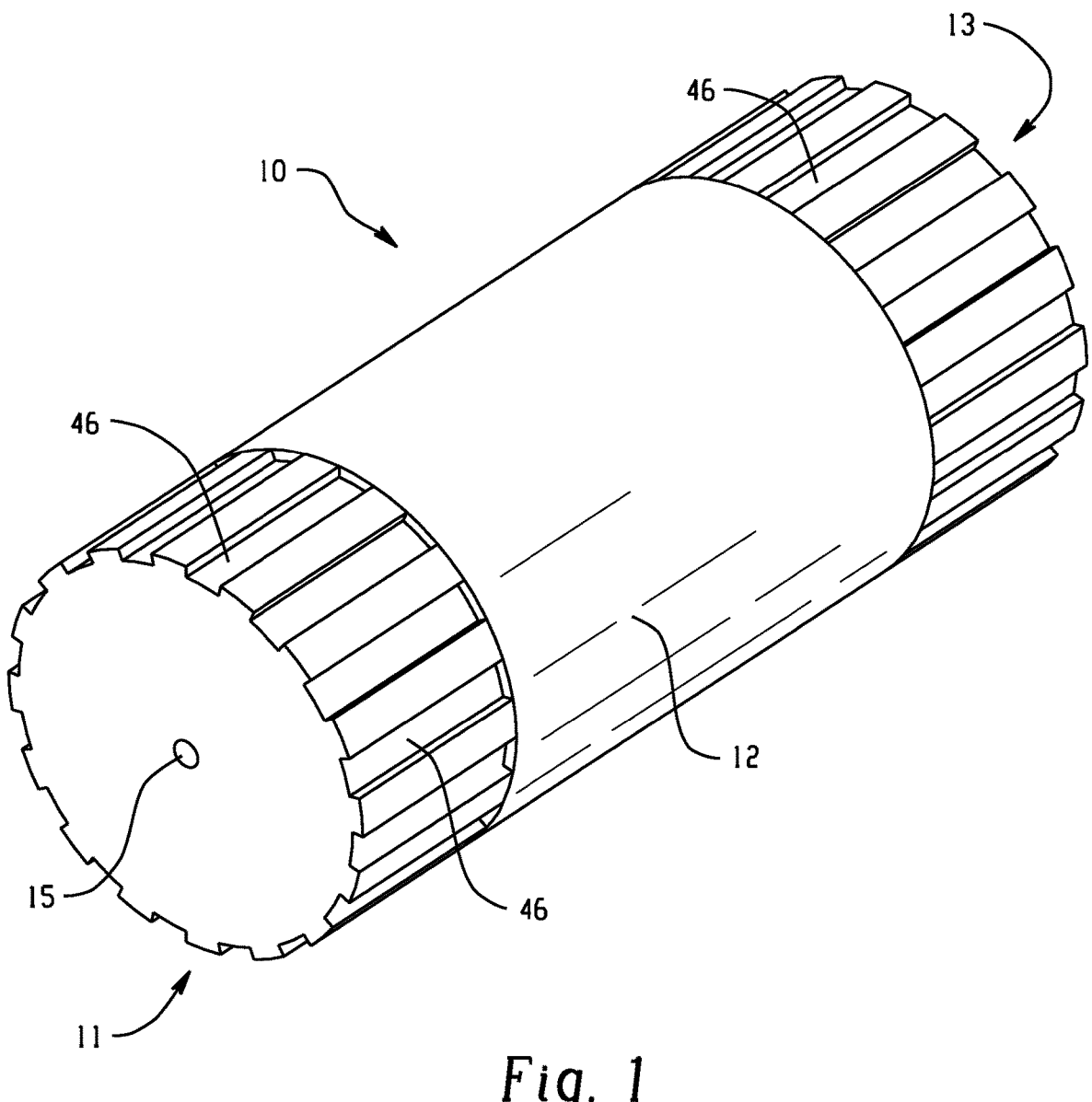

Exemplary embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIG. 1 is a side perspective view of an exemplary static mixer assembly according to the present disclosure.

Figure 2:
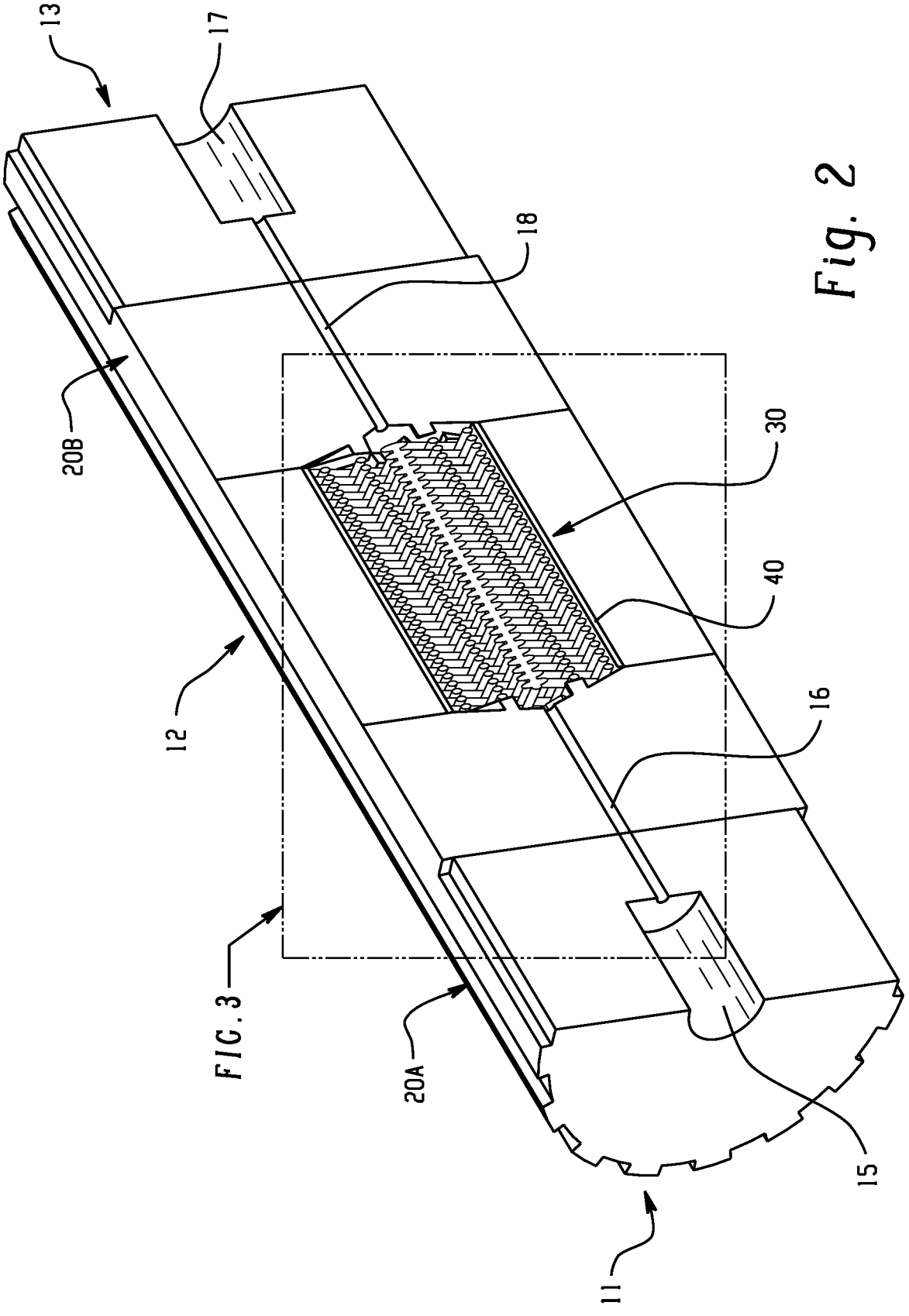

FIG. 2 is a cross-sectional side perspective view of the static mixer assembly of FIG. 1.

Figure 3:
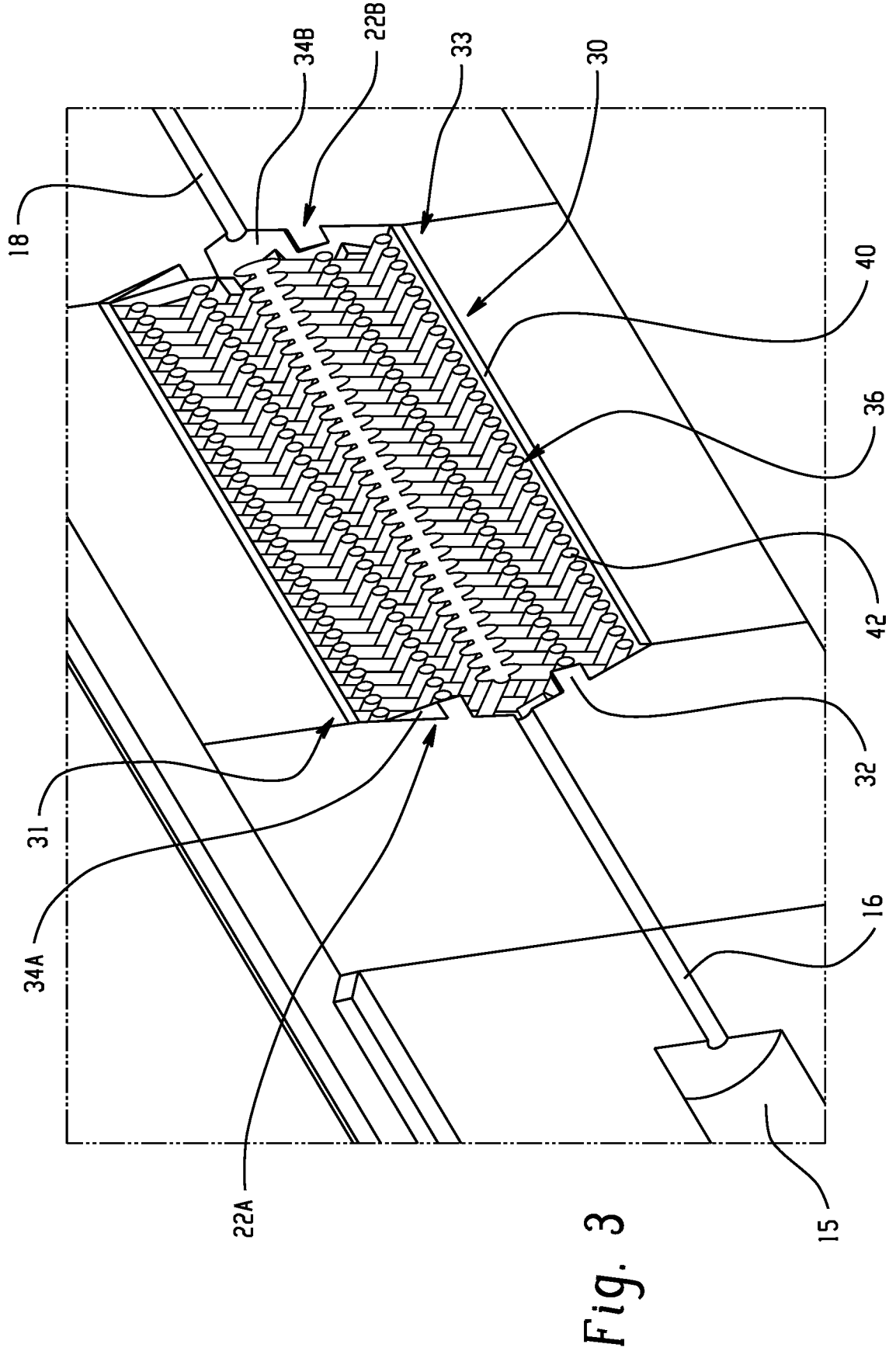

FIG. 3 is a partial exploded view of FIG. 2.

Figure 4:
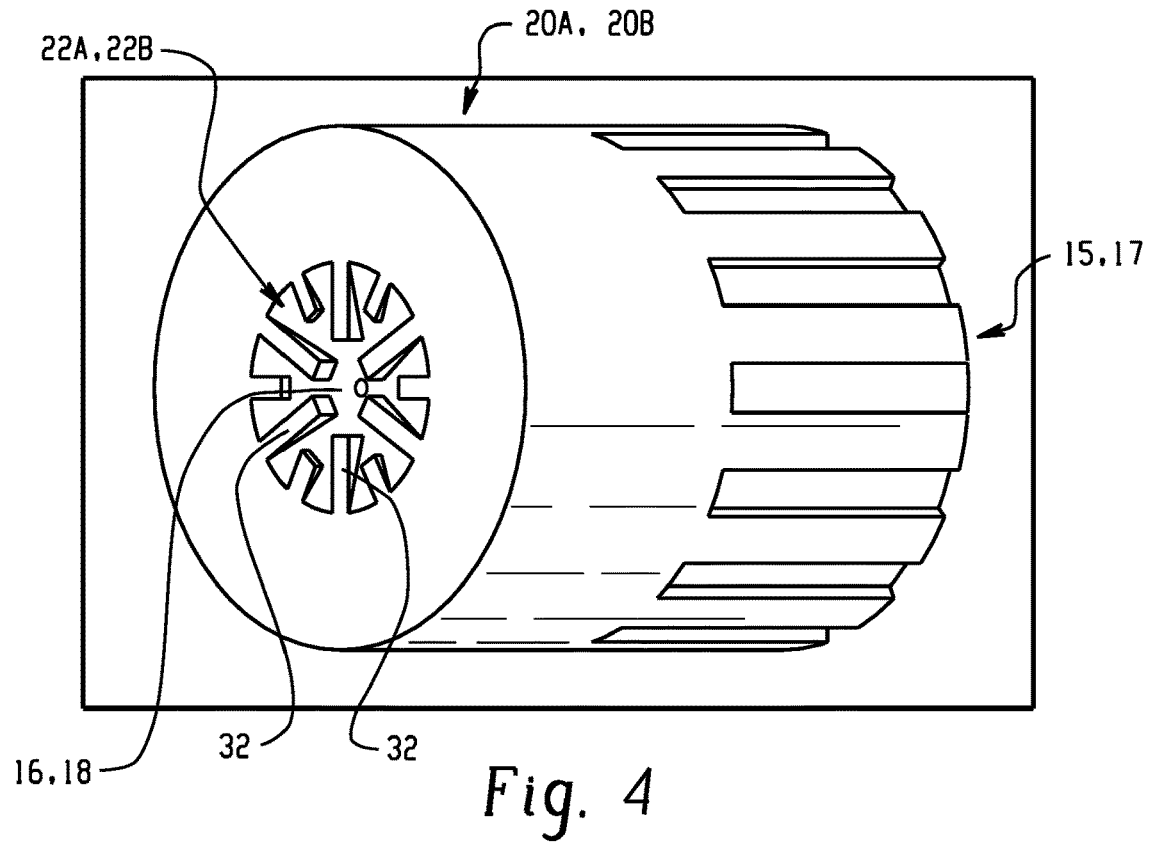
Figure 5:
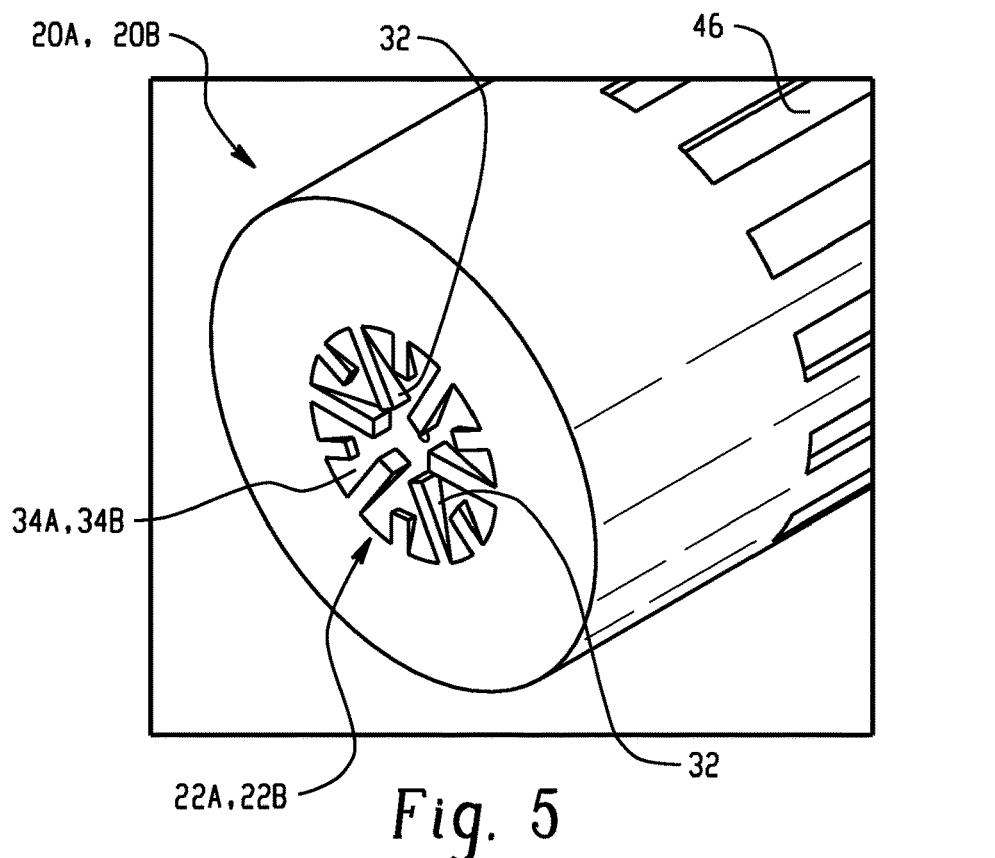

FIGS. 4-5 are side perspective views of exemplary end members.

Figure 6:
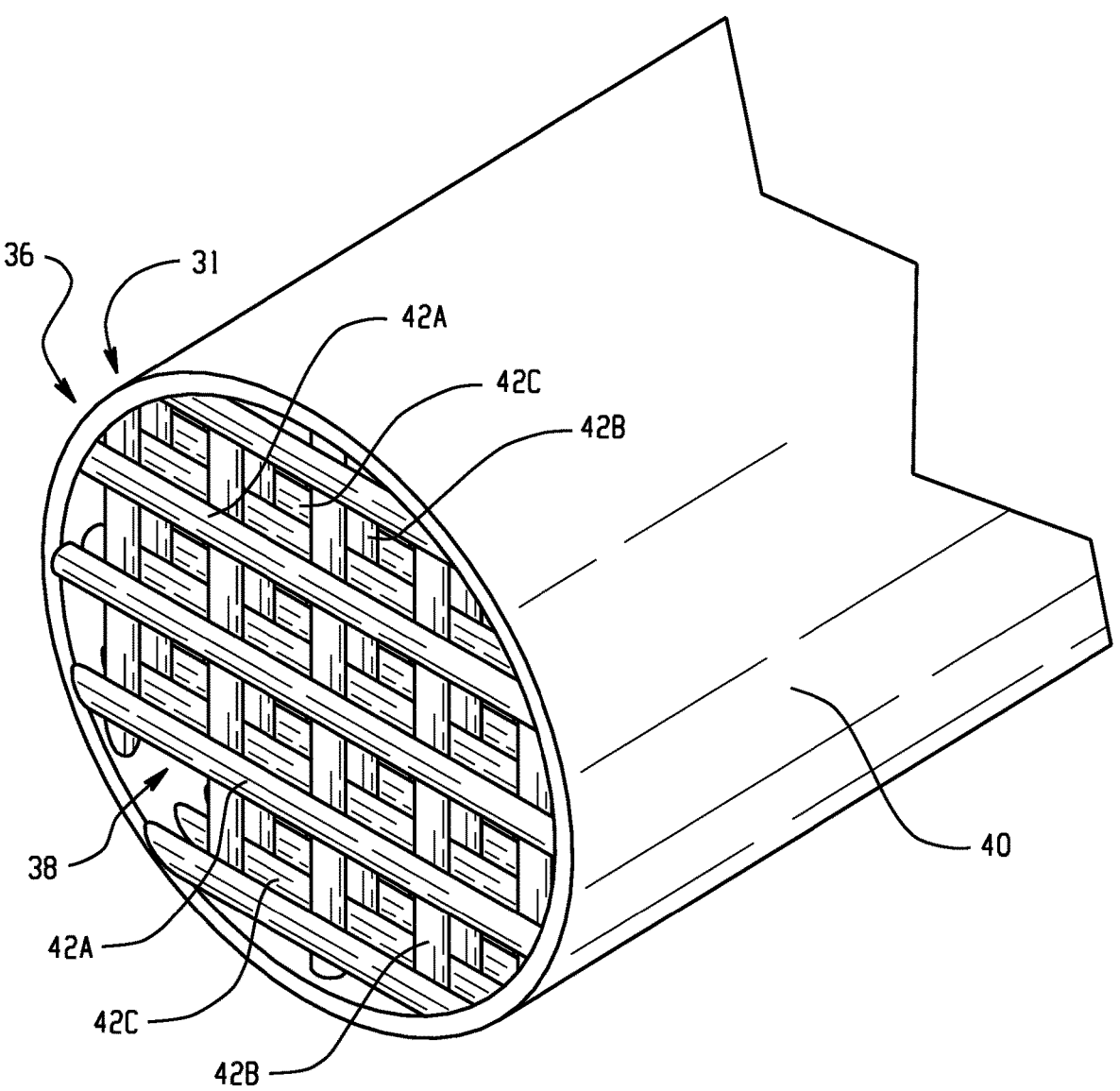

FIGS. 6-7 are partial side perspective views of an exemplary internal mixer section.

FIG. 8 is a partial front view of an exemplary internal mixer section.

FIG. 9 is a partial side perspective view of an exemplary internal mixer section.

FIG. 10 is a partial front view of an exemplary internal mixer section.

Figure 11:
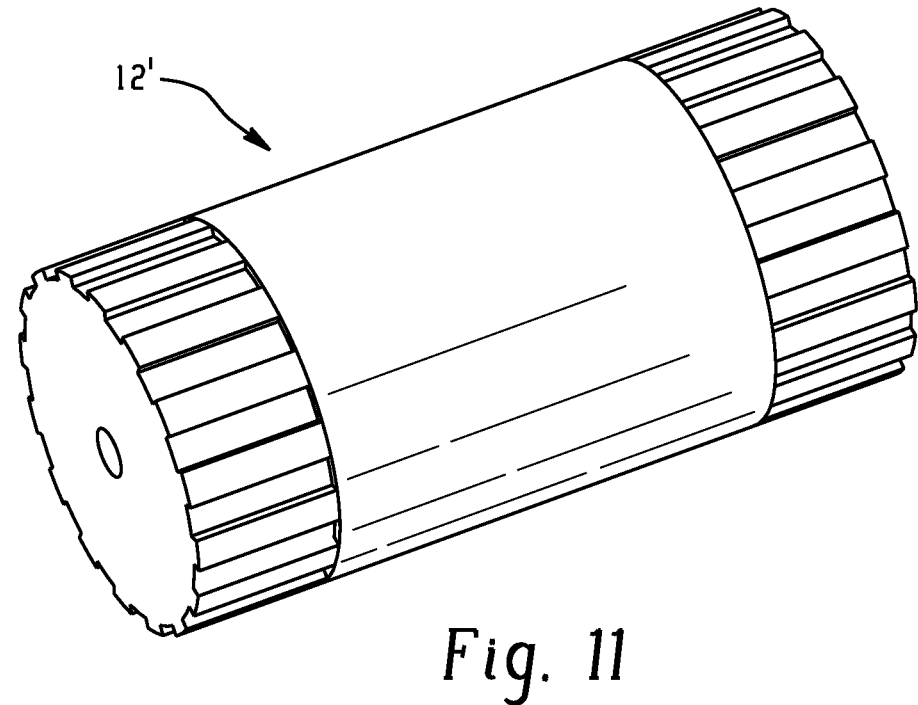

FIG. 11 is another exemplary static mixer assembly according to the present disclosure.

Figure 12:
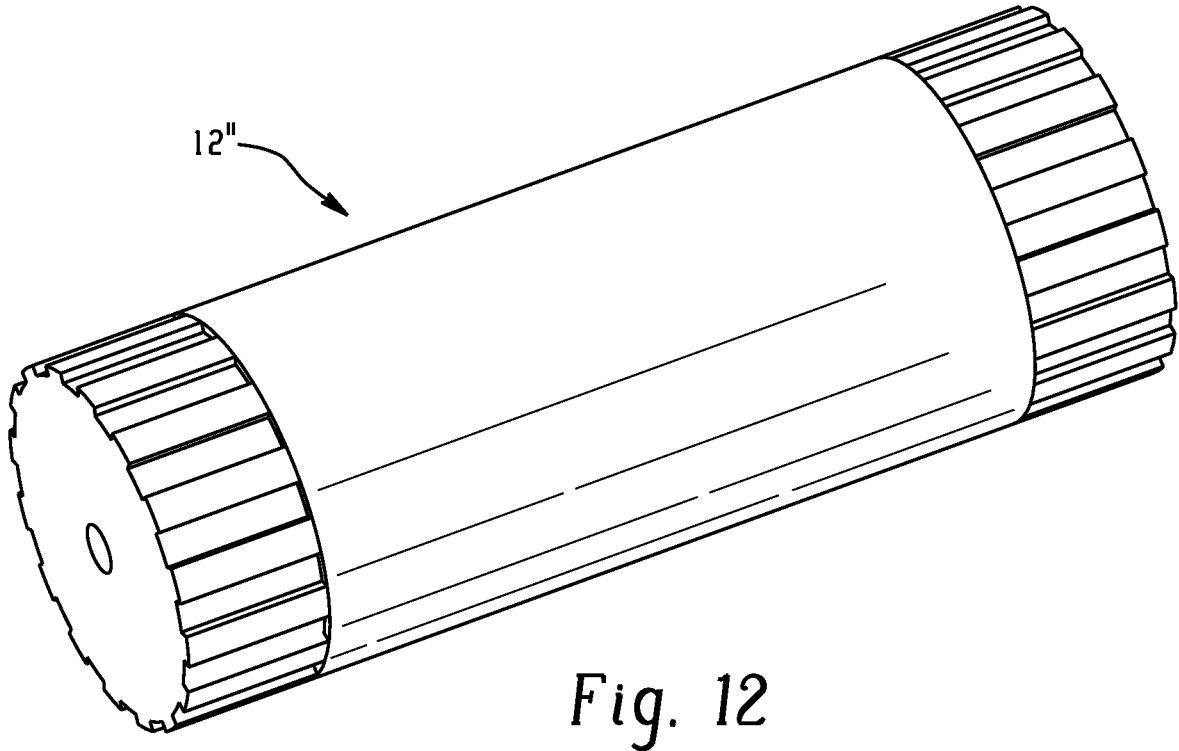

FIG. 12 is another exemplary static mixer assembly according to the present disclosure.

Figure 13:
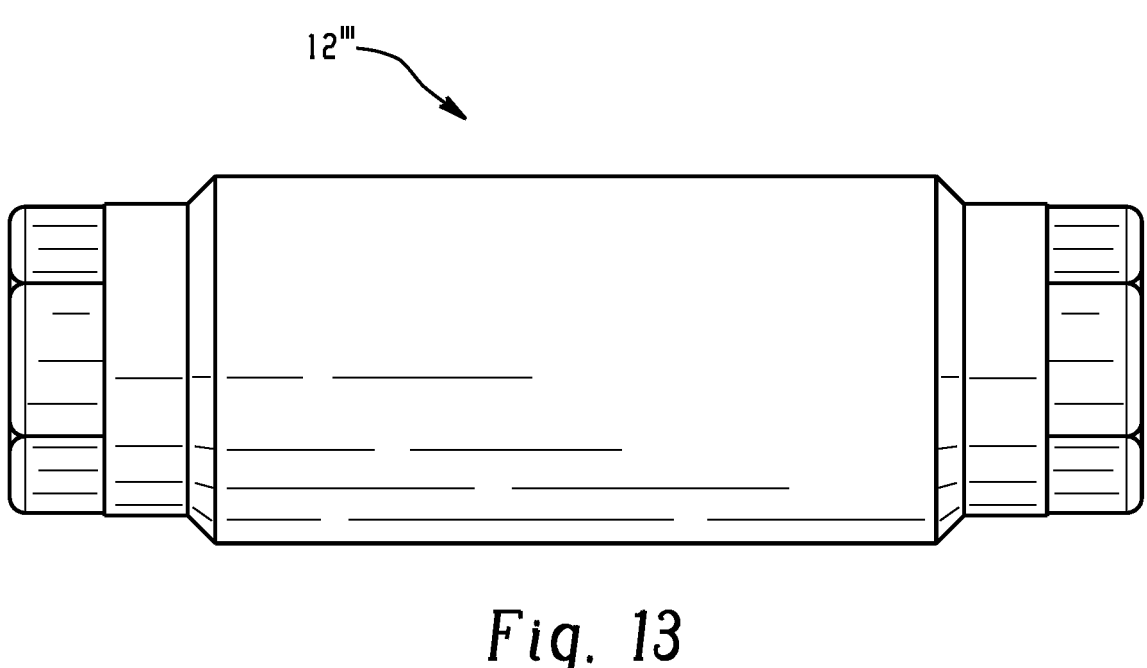

FIG. 13 is another exemplary static mixer assembly according to the present disclosure.

Figure 14:
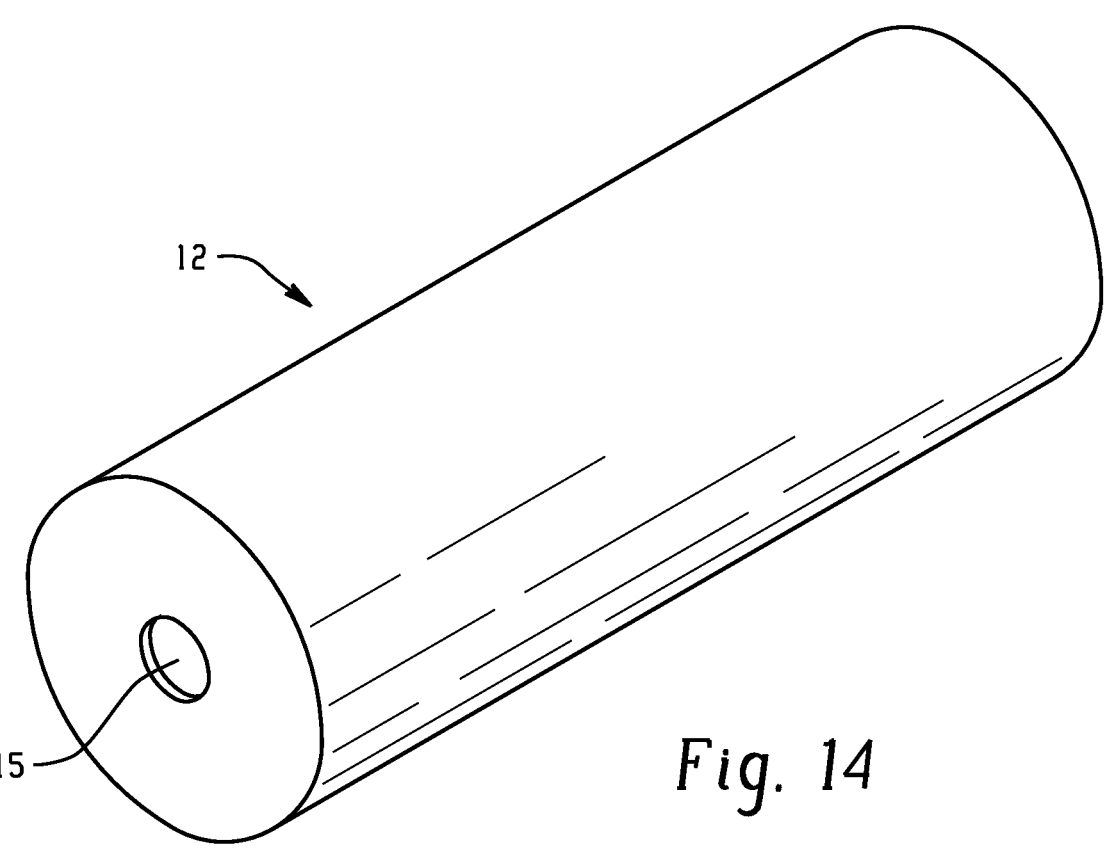

FIG. 14 is another exemplary static mixer assembly according to the present disclosure.

Figure 15:
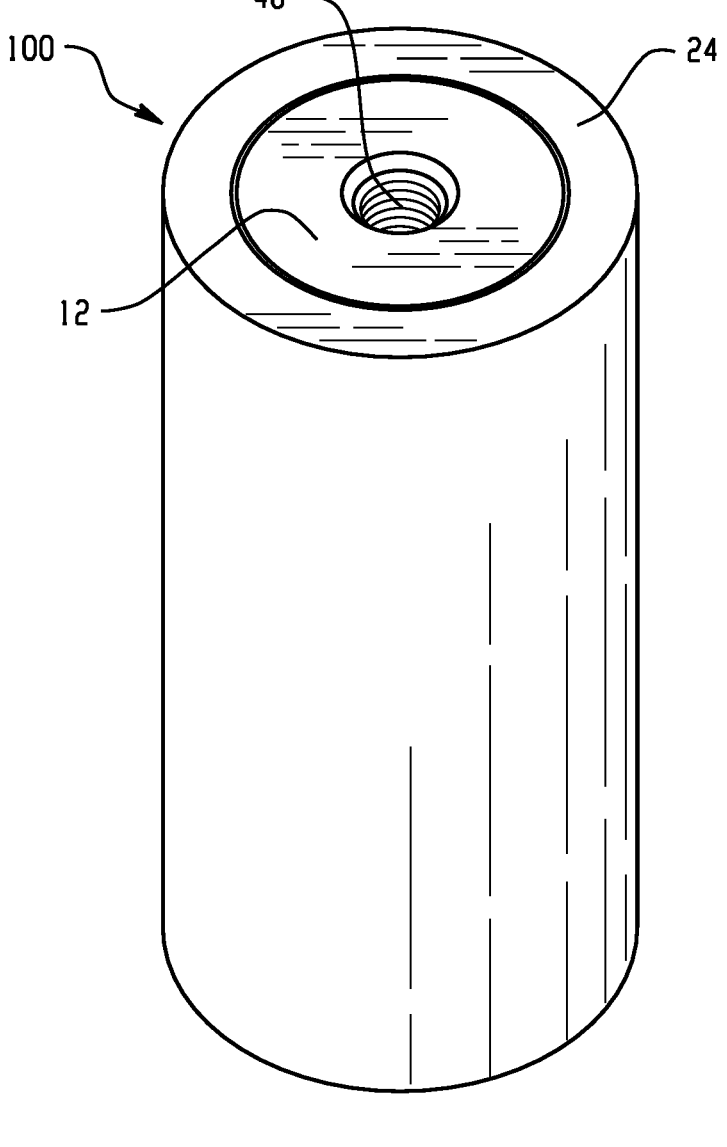

FIG. 15 is a side perspective view of the static mixer assembly of FIG. 14, after housing the mixer body in a housing member.

Figures 16, 17:
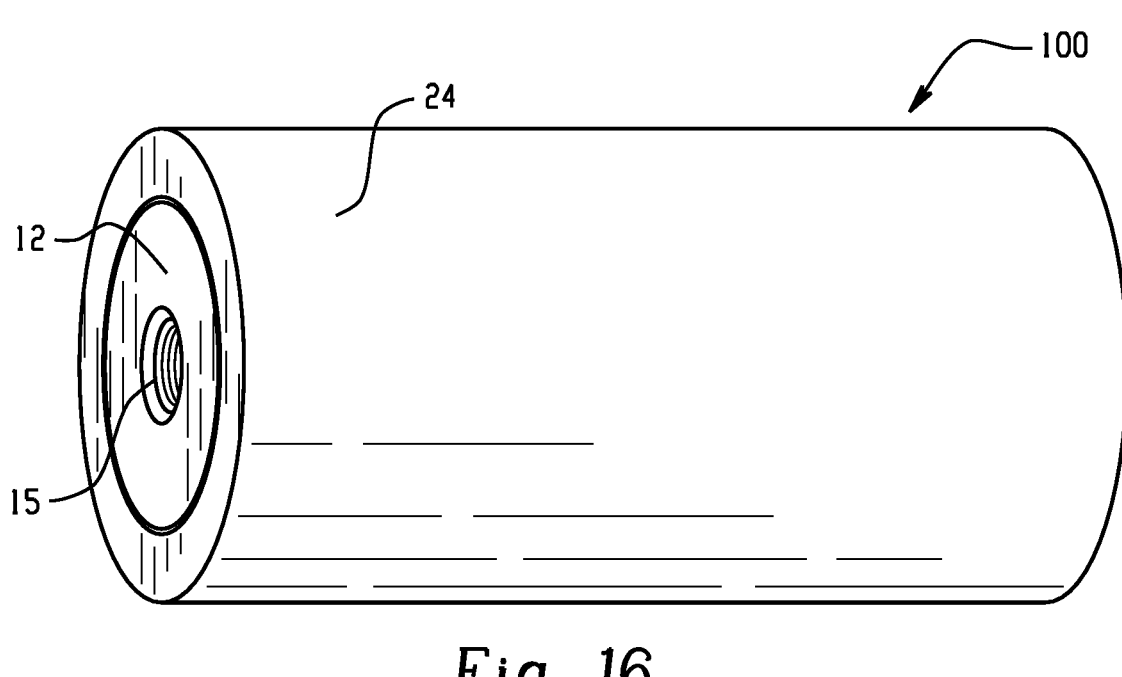

FIG. 16 is a side perspective view of the static mixer assembly of FIG. 15.

FIG. 17 is a side view of the static mixer assembly of FIG. 16.

Figure 18:
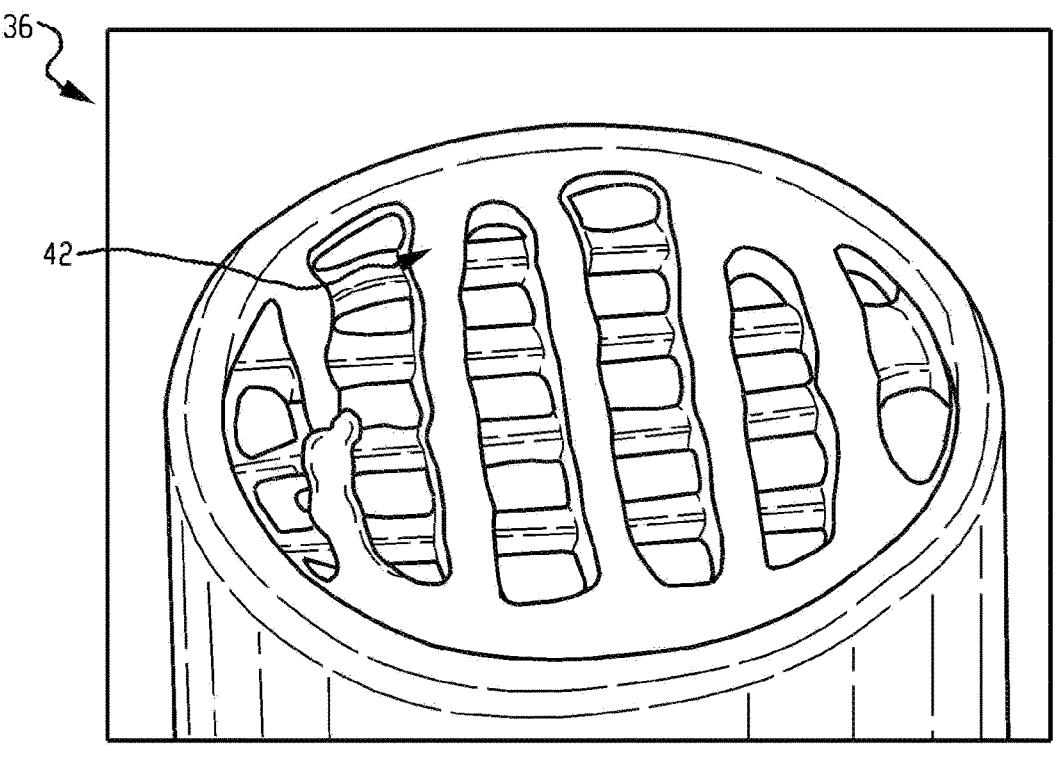
Figure 19:
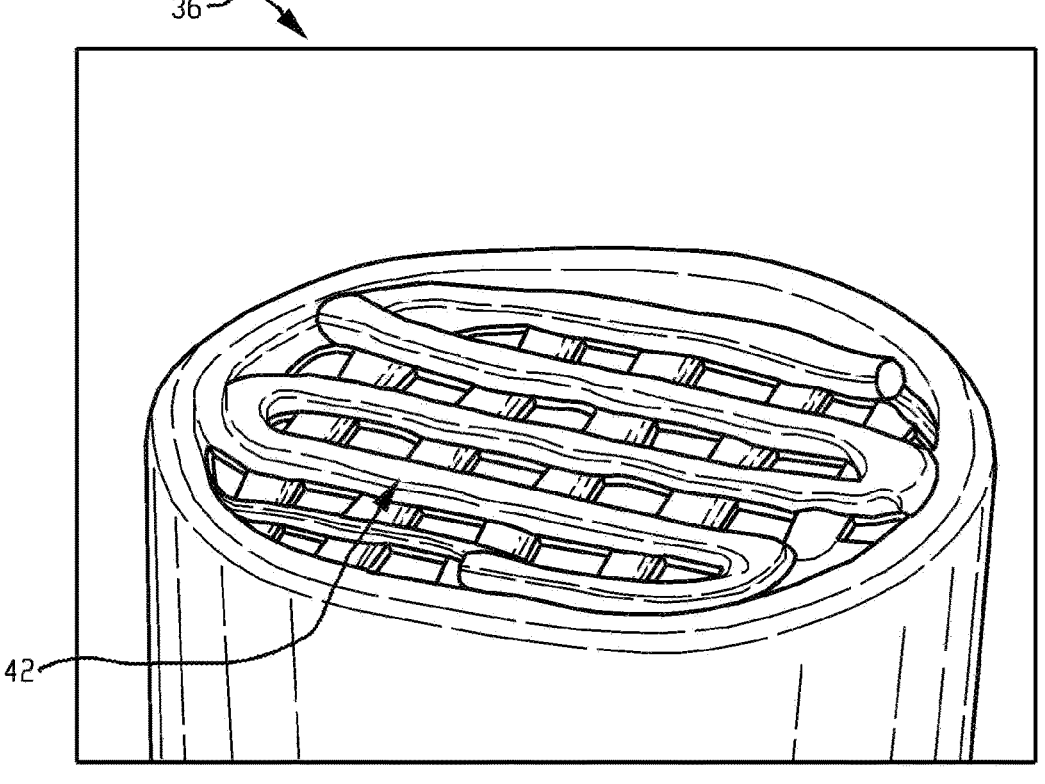

FIGS. 18-19 are side perspective views of the mixer portion of the static mixer assembly of FIG. 14.

Figure 20:
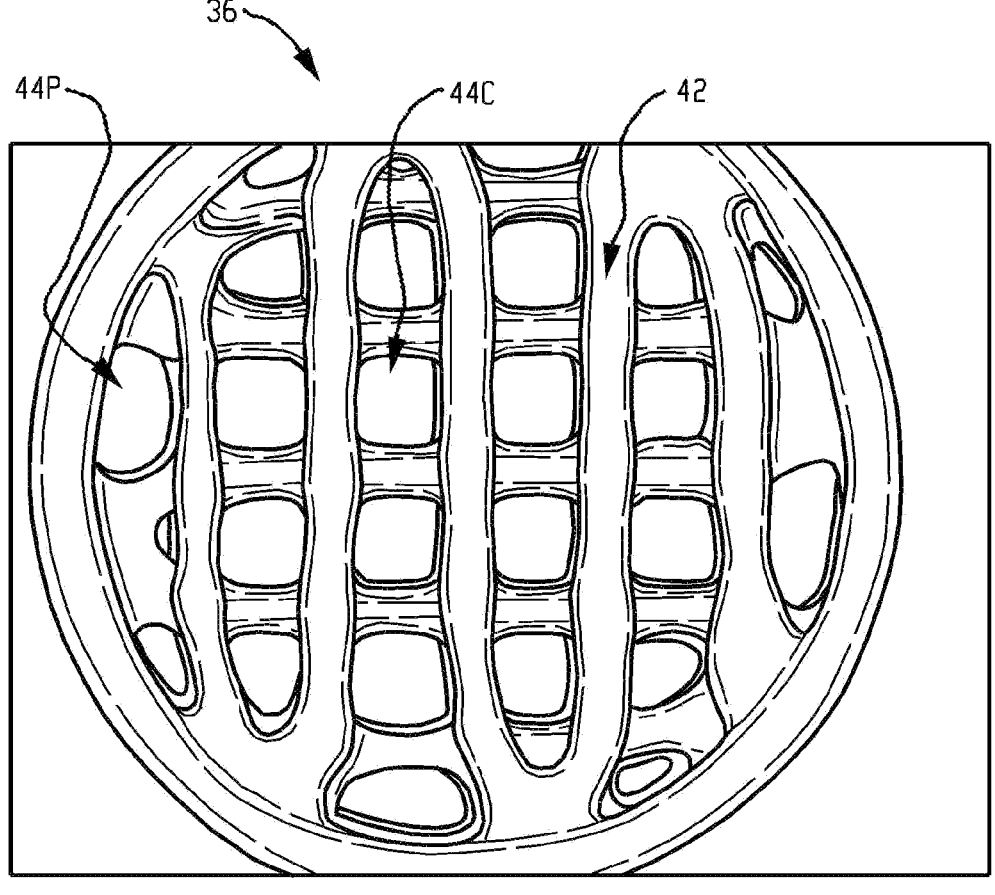

FIG. 20 is an end view of the mixer portion of the static mixer assembly of FIG. 14.

FIG. 21 is an end view of another exemplary static mixer assembly according to the present disclosure.

FIG. 22 is a cross-sectional view of the exemplary static mixer assembly of FIG. 21.

FIG. 23 is a chart showing a time and temperature profile for an exemplary mixer body.

DETAILED DESCRIPTION OF THE DISCLOSURE

The exemplary embodiments disclosed herein are illustrative of advantageous static mixer assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary static mixer assemblies and associated processes/techniques of fabrication/assembly and use are not to be interpreted as limiting, but merely as the basis for teaching one skilled in the art how to make and use the advantageous static mixer assemblies and/or alternative static mixer assemblies of the present disclosure.

The present disclosure provides advantageous static mixer assemblies, and improved systems/methods for utilizing and/or fabricating the static mixer assemblies.

More particularly, the present disclosure provides static mixer assemblies fabricated at least in part by additive manufacturing (e.g., via a 3D printing process, such as, for example, via a FDM process), and related methods of use.

The static mixer assemblies of the present disclosure can be particularly well-suited for applications such as, without limitation, high performance liquid chromatography ("HPLC") applications.

Referring now to the drawings, like parts are marked throughout the specification and drawings with the same reference numerals, respectively. Drawing figures are not necessarily to scale and in certain views, parts may have been exaggerated for purposes of clarity.

As shown in FIG. 1, an exemplary static mixer assembly 10 includes a mixer body 12 that extends from a first end 11 to a second end 13. The first end 11 includes a first opening 15, and the second end 13 includes a second opening 17 (FIG. 2).

In exemplary embodiments and as discussed further below, at least a portion of mixer body 12 is fabricated by additive manufacturing (e.g., via a 3D printing process, such as, for example, via a fused deposition modeling ("FDM") process).

It is noted that at least a portion of the exemplary mixer bodies 12 of the present disclosure can be fabricated/printed via an additive manufacturing or a 3D printing process. In exemplary embodiments, at least a portion of the mixer bodies 12 are fabricated/printed utilizing a fused filament fabrication or fused deposition modeling ("FDM") process, although the present disclosure is not limited thereto.

In general, fused filament fabrication or fused deposition modeling is a 3D printing process. FDM is an additive manufacturing method where a filament (e.g., thermoplastic polymer filament) is fed into a heated nozzle and molten polymer is extruded from this heated nozzle as a very fine extrusion. In general, the smaller the nozzle utilized, the greater the final resolution, but the print times can be very long. A common nozzle diameter is 0.4 mm, but they generally can be as small as 0.2 mm and as large as 1 mm. The nozzle is commonly mounted onto an x-y-z gantry system with the nozzle height relative to the x-y axis table, and the x-y axis table is precisely controlled via stepper or servo motors. A CAD model of the part to be fabricated/ printed (e.g., mixer body 12) is sliced into fine layers along the z (vertical) axis and a computer controls the relative position of the extrusion nozzle relative to the x-y table to print the part one layer at a time. The extruder is turned on and the computer moves the x-y table axes to deposit the first layer of the model onto the build plate. Once the first layer is deposited, the vertical axis (z) is adjusted to the next layer and the process is repeated until the entire volume of the part is fabricated/printed. The temperature of the nozzle is set to the melting temperature of the polymer to be used for the print and can generally range from about 190° C. for low performance polymers (e.g., polylactide or PLA polymer), or 265° C. for medium performance polymers (e.g., nylon), or 420° C. for high performance polymers (e.g., polyether ether ketone or PEEK). The bed in which the part is printed can be at ambient temperatures for low performance polymers such as PLA and is usually heated to temperatures near 200° C. for high performance polymers such as PEEK. Sometimes the air temperature is heated to promote inter-layer adhesion and is often needed for higher performance polymers such as PEEK to prevent cracking of the part during cooling/solidification. In general, FDM may not be a quick process, and larger more complex parts (e.g., engine blocks) can take days to print while smaller parts such as something the size of a penny can print in a few minutes. In some embodiments, it can take between two to 4 hours to fabricate/print one of the exemplary mixer bodies 12 (e.g., PEEK mixer body 12) utilizing a current design.

An exemplary printer utilized to fabricate/print an exemplary mixer body 12 (e.g., PEEK mixer body 12) is a Creatbot F430. In certain embodiments, this printer was modified to print exemplary mixer bodies 12 by adding an additional heater to allow the build plate to heat to 200° C. For an exemplary Creatbot F430 printer, the maximum extruder temperature was 420° C.; the maximum bed temperature was 110/200° C.; the maximum air temperature was 110° C.; the print bed size was 300 mm×400 mm; and the print height was 300 mm.

In other embodiments of the present disclosure, it is noted that at least a portion of the mixer bodies 12 can be fabricated using laser additive manufacturing technology ("LAMT"). As used herein, additive manufacturing refers to a 3D printing process whereby successive layers of material are formed to create an object of a desired shape. Laser additive manufacturing or LAMT refers to additive manufacturing techniques that employ a laser to melt, soften, sinter or otherwise affect the material used in the object being manufactured. By varying material and manufacturing process specifications and conditions, a desired mixer body 12 can be fabricated.

The lasers utilized can include any suitable lasers, such as carbon dioxide pulsed. In general, the laser scans across the surface of a first layer of a particle bed placed onto a build plate to melt or sinter the particles, followed by the application of another layer of particles for subsequent laser scanning and melting or sintering. Multiple subsequent layers are created as the laser scans across the bed and layers of particulate are applied as necessary to create a product (e.g., mixer body 12).

The materials used in the present disclosure for LAMT are materials provided in particulate form that can be sintered, partially melted, or entirely melted by a laser used in laser additive manufacturing techniques. It is noted that various polymer materials can be used for the laser additive manufacturing techniques to fabricate print exemplary mixer bodies 12.

The additive manufacturing or a 3D printing processes (e.g., FDM or LAMT techniques) as described herein can be used to manufacture mixer bodies 12 with complex shapes/ designs (e.g., and that are highly effective yet small in shape). Generally, and without wishing to be bound by theory, the small and unique complex shapes/designs of the mixer bodies 12 of the present disclosure that may be manufactured using additive manufacturing or a 3D printing processes (e.g., FDM or LAMT techniques) yield complex fluid flow patterns that, when compared with conventional mixers, result in more thorough mixing over smaller internal volumes. The result can be a smaller sized mixer assembly 10 that can be used for the thorough mixing of multiple fluids. As such, the static mixer assemblies 10 of the present disclosure can be particularly well-suited for applications such as, without limitation, HPLC.

With reference now to FIGS. 1-3, exemplary mixer body 12 includes a first end member 20A, a mixer portion 30, and a second end member 20B. It is noted that in certain embodiments, end members 20A, 20B are essentially mir-ror-images of one another, and are positioned 180 degrees relative to one another and relative to mixer portion 30.

The first opening 15 of first end member 20A extends inward (e.g., toward mixer portion 30) and is fluid commu-nication with a first flow channel 16. Likewise, the second opening 17 of second end member 20B extends inward (e.g., toward mixer portion and is fluid communication with a second flow channel 18. In general, first flow channel 16 is smaller (e.g., in diameter) than first opening 15, and second flow channel 18 is smaller (e.g., in diameter) than second opening 17. First and second flow channels 16, 18 can take the form of a capillary tube or the like, although the present disclosure is not limited thereto. In general first flow channel 16 (or second flow channel 18) is configured and dimen-sioned to deliver fluid (e.g., HPLC fluids) to the internal mixer section 36 of mixer portion 30, discussed below.

The first flow channel 16 extends from the first opening 15 to a first manifold 22A of end member 20A. The second flow channel 18 extends from the second opening 17 to second manifold 22B of end member 20B.

In general, each manifold 22A, 22B is positioned proxi-mal to mixer portion 30. In general, each manifold 22A, 22B includes one or more wedge members 32 (e.g., a plurality of wedge members 32). Wedge members 32 can extend from or be positioned proximal to inner walls 34A, 34B.

It is noted that an inner wall 34A, 34B of each manifold 22A, 22B can be angled (e.g., angled about 10 degrees) relative to the planar surface of ends 11, 13. In exemplary embodiments, the position where first flow channel 16 meets manifold 22A creates mixing point for fluids, and the position where second flow channel 18 meets manifold 22B creates a mixing point for fluids.

In exemplary embodiments, manifold 22A is positioned proximal to the outer circumference (e.g., outer diameter) of first end 31 of internal mixer section 36 of mixer portion 30, and manifold 22B is positioned proximal to the outer circumference (e.g., outer diameter) of second end 33 of internal mixer section 36 of mixer portion 30. In general, manifold 22A (or manifold 22B) is configured and dimensioned to distribute fluid flow over the area (e.g., larger area) of the internal mixer section 36.

In some embodiments, the outer circumference (e.g., outer diameter) of manifold 22A is substantially the same size as the outer circumference (e.g., outer diameter) of first end 31 of internal mixer section 36, and the outer circumference (e.g., outer diameter) of manifold 22B is substantially the same size as the outer circumference (e.g., outer diameter) of second end 33 of internal mixer section 36.

In exemplary embodiments, internal mixer section 36 of mixer portion 30 extends from first end 31 to second end 33 (FIG. 3) and defines a lumen 38 (e.g., cylindrical lumen 38) having an outer wall 40.

As discussed further below, a plurality of grid members 42 are positioned in the lumen 38, with the grid members or rods 42 generally extending across the lumen 38 from one side of wall 40 to another side of wall 40. In exemplary embodiments, the plurality of grid members or rods 42 extend from the first end 31 to the second 33 of internal mixer section 36, although the present disclosure is not limited thereto.

In general, wedge members 32 of manifolds 22A, 22B are configured and dimensioned to provide support to outermost grid members 42 at ends 31, 33 of internal mixer section 36 (e.g., especially during the additive manufacturing or 3D printing process of mixer body 12).

As shown in FIGS. 2, 3 and 6-10, a plurality of grid members or rods 42 (e.g., 42A, 42B, 42C, etc.) are positioned in the lumen 38, with the grid members or rods 42 generally extending across the lumen 38 from one side of wall 40 to another side of wall 40, and with the plurality of grid members or rods 42 extending from the first end 31 to the second 33 of internal mixer section 36.

In exemplary embodiments and during manufacture/fabrication of mixer body 12 (e.g., via additive manufacturing or a 3D printing process), it is noted that the fabrication of mixer body 12 can start from either end 11 or 13 of mixer body 12.

For example, when the fabrication (e.g., via additive manufacturing or a 3D printing process) of mixer body 12 starts at end 11, the first end member 20A will be fabricated first until reaching the point when the fabrication of the mixer portion 30 will begin.

As shown in FIG. 7, the internal mixer section 36 of mixer portion 30 can then be fabricated, starting at first end 31 of internal mixer section 36. The outer wall 40 that eventually defines lumen 38 can then begin to be fabricated, and a first plurality of grid members 42A positioned proximal to first end 31 can be fabricated, with each grid member 42A of the first plurality of grid members 42A extending from one side of wall 40 to another side of wall 40 (FIGS. 7-8).

For example and as shown in FIGS. 7-8, the first plurality of grid members 42A positioned proximal to first end 31 can include five grid members 42A, with the grid members 42A extending horizontally across lumen 38 from sides of wall 40. It is noted that the first plurality of grid members 42A can include a variety of number of grid members 42A (e.g., one or more grid members 42A; two; three; four; six; etc.). It is also noted that the first plurality of grid members 42A can extend across lumen 38 from sides of wall 40 in a variety of different ways and/or in a variety of different combinations (e.g., vertically; diagonally; some vertically and some horizontally; some vertically and some diagonally; some horizontally and some diagonally; etc.).

After the first plurality of grid members 42A positioned proximal to first end 31 are fabricated, a second plurality of grid members 42B positioned proximal to the first plurality of grid members 42A and positioned within lumen 38 toward second end 33 can be fabricated (FIGS. 9 and 10).

In exemplary embodiments and as shown in FIGS. 9-10, the second plurality of grid members 42B can include five grid members 42B, with the grid members 42B extending vertically across lumen 38 from sides of wall 40.

It is noted that the second plurality of grid members 42B can include a variety of number of grid members 42B (e.g., one or more grid members 42B; two; three; four; six; etc.). It is also noted that the second plurality of grid members 42B can extend across lumen 38 from sides of wall 40 in a variety of different ways and/or in a variety of different combinations (e.g., vertically; diagonally; some vertically and some horizontally; some vertically and some diagonally; some horizontally and some diagonally; etc.).

As shown in FIGS. 9 and 10, each grid member 42A, 42B connects to two sides of wall, and each grid member 42A connects to or is positioned proximal to one or more grid members 42B.

After the second plurality of grid members 42B are fabricated, a third plurality of grid members 42C positioned proximal to the second plurality of grid members 42B and positioned within lumen 38 toward second end 33 can be fabricated (FIG. 6).

In exemplary embodiments, the third plurality of grid members 42C can include five grid members 42C, with the grid members 42C extending horizontally across lumen 38 from sides of wall 40 (e.g., similar to grid members 42A).

It is noted that the third plurality of grid members 42C can include a variety of number of grid members 42C as similarly noted above, and that the third plurality of grid members 42C can extend across lumen 38 from sides of wall 40 in a variety of different ways and/or in a variety of different combinations as similarly noted above.

In general, each grid member 42C connects to two sides of wall, and each grid member 42C connects to or is positioned proximal to one or more grid members 42B.

After the third plurality of grid members 42C are fabricated, a fourth plurality of grid members 42D positioned proximal to the third plurality of grid members 42C and positioned within lumen 38 toward second end 33 can be fabricated (FIG. 6).

In exemplary embodiments, the fourth plurality of grid members 42D can include five grid members 42D, with the grid members 42D extending vertically across lumen 38 from sides of wall 40 (e.g., similar to grid members 42B).

It is noted that the fourth plurality of grid members 42D can include a variety of number of grid members 42D as similarly noted above, and that the fourth plurality of grid members 42D can extend across lumen 38 from sides of wall 40 in a variety of different ways and/or in a variety of different combinations as similarly noted above.

In general, each grid member 42D connects to two sides of wall, and each grid member 42D connects to or is positioned proximal to one or more grid members 42C.

This fabrication process can then be repeated the length of the lumen from first end 31 to second end 33 (e.g., after fabricating grid members 42D, then grid members 42E can be fabricated, then grid members 42F can be fabricated, then grid members 42G can be fabricated, etc.).

In exemplary embodiments and as shown in FIG. 3, every other plurality of grid members 42 are positioned or oriented the same or similar way across lumen 38 (e.g., grid members 42A and 42C and 42E, etc. are oriented or positioned so that they extend horizontally across lumen 38 from sides of wall 40; and grid members 42B and 42D and 42F, etc. are oriented or positioned so that they extend vertically across lumen 38 from sides of wall 40), although the present disclosure is not limited thereto.

In the embodiments where every other plurality of grid members 42 are positioned or oriented the same or similar way across lumen 38, it is noted that this thereby advantageously forms a plurality of longitudinal mixing channels 44 through lumen 38 from first end 31 to second end 36 (FIG. 10).

FIG. 3 shows details of an exemplary internal mixer section 36. The internal mixer section 36 can include stacked grid members 42A, 42B, etc. where every other plurality of grid members 42 are positioned or oriented the same or similar way across lumen 38 to provide the longitudinal mixing channels 44 and also provides openings (e.g., transverse openings between members 42A and 42C, etc.) transverse to the flow direction (e.g., transverse to the flow in channel 16) to provide fluid mixing. The size of the grid member 42 pattern and openings along with the overall diameter and length of the internal mixer section 36 can be tailored to provide specific internal volumes and mixing efficiencies. For example, a diameter of the internal mixer section 36 (e.g., of lumen 38) can be about 7 mm and the length of the internal mixer section 36 (e.g., of lumen 38) can be about 14 mm. It is noted that mixing channels 44 can be different sizes from one another (e.g., opening 44A versus 44B of FIG. 10, etc.).

In another embodiment and as shown in FIGS. 18-20, the width of a few of the grid members 42 (e.g., grid members 42 fabricated from PEEK) are shown. For this example, the grid members 42 are about 0.016 inches (0.4 mm) in width. The through channel openings of the mixing channels 44C near the center are substantially square in shape being about 0.032 inches (0.8 mm) on their sides, and the openings of the mixing channels 44P near the periphery are smaller and not square in shape. The lateral gap openings of these mixing channels 44 are smaller, some being closer to 0.008 inches (0.2 mm).

After all of the plurality of grid members 42 are fabricated (e.g., 42A, 42B, 42C, etc.) and the fabrication process has reached the second end 33, then the second end member 20B can be fabricated until reaching the second end 13 of mixer body 12. In other embodiments, it is noted that mixer body 12 of static mixer assembly 10 can be fabricated starting from second end 13 and then reaching first end 11.

During fabrication of mixer body 12, it is noted that grooves 46 can be fabricated (e.g., printed) on mixer body 12 (e.g., on an outer surface of end members 20A and/or 20B).

After fabrication of mixer body 12, it is noted that threads 48 or the like (FIG. 15) can be machined or fabricated into mixer body 12 (e.g., into a surface proximal to first opening 15 and/or second opening 17). For example, threads 48 can be 10-32 threads configured for a HPLC compression fitting.

After fabrication of mixer body 12, it is also noted that the flow channels 16 and/or 18 can be further machined and/or fabricated.

FIG. 14 shows another exemplary mixer body 12 (e.g., fabricated via FDM and utilizing PEEK), with this mixer body 12 have no grooves 46. Some exemplary dimensions of the mixer body 12 of FIG. 14 can be about 0.612 inch (15.5 mm) by 2.06 inch (51 mm).

After printing the mixer body 12 of FIG. 14, the mixer body 12 was annealed in a convection air oven with a programmable rate of rise and cool down to increase the interlayer strength of the 3D printed part (e.g., mixer body 12). Very slow cooling can be needed after heat treatment to prevent excessive residual stresses in the body 12 and prevent cracking. A typical annealing/heat treatment temperature profile is shown below in Table 1 with temperatures displayed as a percentage of the 3D printing temperature for a specific lot PEEK polymer. The printing temperature typically varies by as much as 30 degrees depending on the supplier.

More specifically, each as printed mixer body 12 was placed into a fixture for heat treating that constrained the mixer body 12 in the radial direction to prevent the body 12 from warping due to non-uniform shrinkage that often occurs during the heat treatment process. Furthermore, a small compressive force was applied axially to the mixer body 12 during heat treating to aid in increased interlayer adhesion. For larger parts, this externally applied force may need to be increased, and for very small parts the applied force may need to be reduced.

TABLE 1

| Process | Temperature (° C.) | Elapsed Time (hrs) |
|---------|--------------------|--------------------|
| Start | 0% | 0.0 |
| Ramp | 30% | 0.3 |
| Hold | 30% | 0.8 |
| Ramp | 70% | 2.0 |
| Hold | 70% | 2.5 |
| Ramp | 80% | 3.5 |
| Hold | 80% | 7.0 |
| Ramp | 50% | 10.0 |
| Hold | 50% | 11.0 |
| Ramp | 35% | 14.0 |
| Hold | 35% | 15.0 |
| Ramp | 0% | 24.0 |

After annealing/heat treatment, the mixer body 12 of FIG. 14 was then coated with epoxy and inserted into a housing 24 (e.g., a stainless steel tube 24) and allowed to cure (assembly 100 of FIGS. 15-17). Once the epoxy was cured, the ends of the mixer body 12 and housing 24 were machined flat and the threads 48 (e.g., HPLC fittings) were machined on both ends of the assembly 100 for the inlet and outlet connections (e.g., 1/16 inch inlets and outlets to the HPLC).

The exemplary stainless steel tube 24 that the mixer body 24 was inserted had an inner diameter (ID) of 0.625 inches and an outer diameter (OD) of 0.875 inches. As such, FIG. 16 shows an oblique view of a static mixer assembly 100 (e.g., 150 uL PEEK mixer body 12 encapsulated in a thick walled stainless steel sleeve 24 to provide enhanced pressure ratings). It is noted that all wetted surfaces of assembly 100 are fabricated from PEEK, and the mixer body 12 was then encapsulated in a thick walled stainless steel sleeve 24 to provide a pressure rating that exceeds 1200 bar (17,400 psi) burst pressures (e.g., for HPLC and/or UHPLC applications).

Some dimensional performance results for this static mixer assembly 100 (e.g., 150 uL PEEK static mixer assembly 100) are presented in Table 2 below. All of the mixer assemblies 100 were tested to 1000 bar pressure and a couple were tested to 1200 bar pressure and no leaks were observed. The internal cavity volumes of the mixer assemblies 100 ranged from 128 to 165 uL with a target value of 150. The mixing efficiency (ripple reduction) for these example assemblies 100 ranged from 80 to 85%.

TABLE 2

| | | As Printed | | | After Machining & Assembly | | | | | | Mott Proof Test | | OSV Proof & Max Test Proof | |
| | | | | | | | | Flow | Ripple | | Burst | | Pressure = | |
| | | Wt | Len | Dia | Weight | Length | Diameter | @ 30 | Reduction | Volume | Pressure | | 680 bar | |
| # | ID | (g) | (in) | (in) | (g) | (in) | (in) | (SLM) | (%) | (uL) | (bar) | P/F | (bar) | (bar) |
|---|---|---|---|---|---|---|---|---|---|---|---|---|---|---|
| 1 | Apr. 22, 2020 | 11.91 | 2.063 | 0.612 | 66.93 | 1.540 | 0.874 | | | | | | | |
| 2 | Apr. 22, 2020 | 11.92 | 2.061 | 0.612 | 64.27 | 1.477 | 0.874 | 6.58 | 80 | 128 | 600 | P | 680 | 1000 |
| 3 | Apr. 23, 2020 | 11.89 | 2.064 | 0.613 | 69.8 | 1.600 | 0.873 | | | | 600 | P | 680 | 1200 |
| 4 | Apr. 23, 2020 | 11.91 | 2.064 | 0.612 | 70.46 | 1.615 | 0.874 | 9.93 | 85 | 165 | 600 | P | 680 | 1000 |
| 5 | Apr. 24, 2020 | 11.9 | 2.066 | 0.612 | 70.62 | 1.618 | 0.874 | 8.79 | 81 | 158 | 600 | P | 680 | 1000 |
| 6 | Apr. 24, 2020 | 11.92 | 2.065 | 0.613 | 67.69 | 1.587 | 0.874 | | | | 600 | P | 680 | 1200 |
| 7 | Apr. 24, 2020 | 11.92 | 2.064 | 0.611 | 78.9 | 1.798 | 0.873 | 8.98 | 84 | 143 | 600 | P | 680 | 1000 |
| 8 | Apr. 25, 2020 | 11.9 | 2.065 | 0.611 | 70.41 | 1.613 | 0.872 | 6.71 | 82 | 161 | 600 | P | 680 | 1000 |
| 9 | Apr. 27, 2020 | 11.89 | 2.066 | 0.613 | 70.83 | 1.628 | 0.873 | 10.28 | 83 | 158 | 600 | P | 680 | 1000 |
| 10 | Apr. 27, 2020 | 11.91 | 2065 | 0.612 | 69.88 | 1.609 | 0.874 | 10.12 | 82 | 148 | 600 | P | 680 | 1000 |
| 11 | Apr. 28, 2020 | 11.9 | 2.064 | 0.610 | | | | | | | | | | |
| 12 | Apr. 28, 2020 | 11.93 | 2.065 | 0.613 | | | | | | | | | | |
| | Min | 11.89 | 2.061 | 0.61 | 64.27 | 1.477 | 0.872 | 6.58 | 80 | 128 | | | | |
| | Max | 11.93 | 2065 | 0.613 | 78.9 | 1.798 | 0.874 | 10.28 | 85 | 165 | | | | |
| | Average | 11.91 | 173.98 | 0.61 | 69.98 | 1.61 | 0.87 | 8.77 | 82.4 | 151.6 | | | | |
| | Std | 0.01 | 595.52 | 0.00 | 3.78 | 0.08 | 0.00 | 1.56 | 1.7 | 12.9 | | | | |

Referring back to FIG. 1, it is noted that there are some cases where the mixer body 12 does not need to have a high pressure rating, and the encapsulation of the mixer body 12 into the housing 24 (e.g., stainless steel sleeve 24) may not be needed.

FIG. 1 depicts a static mixer assembly 10 (not needing housing 24). FIG. 1 depicts the as printed mixer body 12 (e.g., PEEK mixer body 12) targeting 250 uL internal volume for a 400 bar pressure rating. Grooves 45 are printed on the surface of the mixer body 12 to make it easier to hold while tightening the HPLC fittings into its ends. In FIG. 1, the mixer body 12 has not been heat treated nor have the HPLC fittings been machined into its ends yet.

FIG. 11 depicts an example of a finished 350 uL mixer body 12' printed in polyetherketoneketone (PEKK) for a 400 bar pressure rating application. The diameter is 1 inch (25 mm) and the length is 2 inch (50 mm) with standard 1/16 inch HPLC compression fittings machined into both ends.

FIG. 12 depicts an example of a finished 500 uL mixer body 12" printed in PEKK for a 400 bar pressure rating application. The diameter is 0.75 inch (19 mm) and the length is 2.5 inch (64 mm) with standard 1/16 inch HPLC compression fittings machined into both ends.

FIG. 13 depicts an example of a finished 1000 uL mixer body printed in PEEK for a 200 bar pressure rating application. The central diameter is 0.75 inch (19 mm) and the overall length is 2.35 inch (60 mm) with standard 1/16 inch HPLC compression fittings machined into both ends. The inlet and outlet ends have hexagonal cross sections to allow tooling to be used to tighten the fittings.

In another embodiment and as shown in FIGS. 21 and 22, static mixer assembly 200 includes mixer body 12 that is housed within housing 24 (e.g., stainless steel tube 24). Mixer body 12 (e.g., PEEK mixer body 12) of assembly 200 can be fabricated as discussed above.

However, instead of gluing the mixer body 12 into housing 24 (e.g., stainless-steel sleeve 24), the mixer body 12 can be inserted into a housing 24 (e.g., stainless-steel sleeve 24) having threaded ends 50A, 50B with a slip fit and then screw caps or nuts 52A, 52B onto both ends 50A, 50B and compress the mixer body 12 by tightening the end caps 52A, 52B to prevent the mixer body 12 from bursting when under high pressures. In addition, the machining of the HPLC fittings of assembly 200 can be slightly different in that one can machine the taper and 1/16 inch tube ends into the mixer body 12 and the 10-32 threads 48 for the tube fitting can be machined into the stainless-steel caps 52A, 52B on both ends of the mixer assembly 200. This can provide for greater thread strength and allow one to tighten the fittings to higher torque levels using wrenches to ensure that one does not have any leaks at the fittings.

In other embodiments, the internal mixer section 36 is cylindrical in shape with an exemplary diameter of 7.5 mm (0.3 inch) and a length of 13.9 mm (0.55 inch) filled with stacked grid members or rods 42 to achieve a mixing volume of 150 uL for mixer body 12. For larger mixer volumes, this internal mixer section 36 can be increased in length and diameter to achieve the desired volume. A 1000 uL mixer body 12 was fabricated using the internal volume dimensions of 12.5 mm (0.5 inch) diameter by 25.4 mm (1 inch) long. As would be expected, the exterior dimensions increase with increase internal volume and even more so if a higher burst pressure rating is desired.

The internal mixer section 36 can be filled with stacked layers of parallel grid members or rods 42 with each layer of grid members/rods 42 rotated 90 degrees from the previous (see, e.g., FIGS. 6 and 10). The diameters of each grid member or rod 42 can be between 0.1 mm and 0.25 mm diameter with a gap between the rods 42 ranging from 0.1 mm to 0.4 mm depending on the internal volume desired.

When fluids pass through the mixer body 12, the fluid can travel through channels 44 parallel to the flow direction between the rod intersections, and the fluid can travel laterally (e.g., transverse to the flow direction of channel 16, 18) between the stacked layers of parallel grid members or rods 42. It is this lateral flow that recombines with different flow paths that advantageously results in the improved mixing observed using this design of mixer body 12.

The mixer bodies 12 can also be heat treated after fabrication/printing to increase the interlayer adhesions strength which can be weak when using FDM printing in certain embodiments. The mixer bodies 12 can be slowly heated to a set temperature in an convection oven in a nitrogen rich gas environment under axial compression, held at temperature for a pre-determined time period, and then slowly cooled back to room temperature.

It is noted that some embodiments print the stacked rods 42 for each layer rotated 90 degrees from the previous. In other embodiments, the mixer bodies 12 can be printed with these angles being multiples of 45 degrees as well as random. A pilot run has been completed using the 90-degree rotations and the results are shown in Table 3 below. These mixer bodies 12 were printed using the 0.3 inch diameter and 0.55 inch long internal mixer sections 36 as described above.

system with the mixer 12 placed in the fluid path between the proportion valve and the high-pressure pump.

To reduce the complexity and size of a standard HPLC instrument, one could design, for example, a proportion valve body with an internal cavity within the fluid path where the mixing element (lumen) is placed during assembly, thereby eliminating the need for an external inline mixer. This has the advantage of reducing the overall size of the instrument and can reduce the internal volume of the fluid path, which generally improves system performance. The hardware can be designed such that the mixing element (lumen) can be removed and replaced with a mixer of different internal volume if/when needed.

Furthermore, in the examples above described so far, the cross section of the device has been round. It is noted that one is not limited to round cross sections and any shapes/designs (e.g., square, hexagonal, etc.) can be employed (e.g., for aesthetic purposes; or to make it easier to mount the mixer 12 to surfaces when installed into instruments; etc.).

TABLE 3

| | | | | | | | | |
|---|---|---|---|---|---|---|---|---|
| | Flow @ 30 in Table 3 refers to Nitrogen gas flow at 30 psi | | | | | | | |
| | After Anneal | | | Flow | Ripple | | | |
| | Weight | Length | Diameter | @ 30 | Reduction | Volume | Burst Pressure | |
| # | (g) | (in) | (in) | (SLM) | (%) | (uL) | (bar) | (psi) |
| 1 | 32.22 | 2.012 | 1.004 | 8.83 | 71 | 149 | 968 | 14040 |
| 2 | 32.17 | 2.033 | 1.001 | 5.63 | 72 | 182 | 994 | 14417 |
| 3 | 32.16 | 2.005 | 1.002 | 9.11 | 63 | 149 | | |
| 4 | 32.14 | 2.033 | 1.000 | 9.71 | 67 | 178 | | |
| 5 | 32.13 | 2.010 | 1.003 | 10.10 | 64 | 163 | | |
| 6 | 32.12 | 2.012 | 1.004 | 11.03 | 69 | 166 | | |
| 7 | 31.88 | 1.988 | 1.006 | 12.45 | 68 | 156 | 915 | 13271 |
| 8 | 32.18 | 2.025 | 1.001 | 9.87 | 77 | 169 | 1061 | 15389 |
| 9 | 32.14 | 2.013 | 1.004 | 11.50 | 65 | 160 | | |
| 10 | 32.22 | 2.012 | 1.002 | 10.72 | 60 | 160 | 980 | 14214 |
| 11 | 32.18 | 2.015 | 1.004 | 10.40 | 66 | 163 | | |
| 12 | 32.11 | 2.028 | 1.002 | 10.29 | 74 | 155 | 910 | 13199 |
| Min | 31.88 | 1.988 | 1.000 | 5.63 | 60 | 149 | 910 | 13199 |
| Max | 32.22 | 2.033 | 1.006 | 12.45 | 77 | 182 | 1061 | 15389 |
| Average | 32.14 | 2.016 | 1.003 | 9.97 | 68 | 163 | 971 | 14088 |
| Std | 0.09 | 0.013 | 0.002 | 1.69 | 5 | 10 | 56 | 810 |

It is noted that the examples shown so far are primarily for inline applications where the mixer 12 is placed between two objects with one or more flow inlet lines attached, and one outlet line attached. However, there are applications where it may be desired to attach the mixer 12 directly to a pump, or a proportion valve, or other equipment without the use of tubing and/or compression fittings. It is often desired to reduce the internal volume of the fluid path in a system or to save space when it is desired to reduce the overall size of the HPLC system. One example would be to replace the standard ¹⁄₁₆ inch 10-32 internal compression fitting (female) with an external 10-32 compression fitting (male) which would allow the user to attach the mixer 12 directly to another component in the HPLC instrument without the use of additional tubing and compression fittings.

In general, static mixers are used in HPLC instruments downstream of the pump and are on the high-pressure side of the system. When one wishes to perform low pressure mixing (upstream of the pump), some instrument manufacturers use a ¼-28 flat bottom fitting for these cases, and for such applications one can make the mixers as described earlier using the ¼-28 flat bottom fittings rather than the more common ¹⁄₁₆ inch 10-32 compression fittings. An example of this would be for use in a quaternary pump Also, in the examples described above, the inlet and outlet to the mixer 12 are parallel to the flow direction through the device. For example and typically in cases where space may be limited, the inlets and/or outlet can be mounted at an angle (e.g., typically 90 degrees) from the axial direction of the mixer 12 (e.g., to make the mixer 12 fit within smaller spaces).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A static mixer assembly comprising:
a mixer body that extends from a first end to a second end, the first end having a first opening and the second end having a second opening, the mixer body including a first end member, a mixer portion, and a second end member, with the mixer portion having an internal mixer section;
the first opening extending inward toward the mixer portion and in fluid communication with a first flow channel, and the second opening extending inward toward the mixer portion and in fluid communication with a second flow channel;
the first flow channel extending from the first opening to a first manifold positioned proximal to a first end of the internal mixer section and the second flow channel extending from the second opening to a second manifold positioned proximal to a second end of the internal mixer section;
the internal mixer section defining a lumen having an outer wall; and a first, a second and a third plurality of grid members positioned in the lumen, with the grid members of the first, second and third plurality of grid members each extending across the lumen from one side of the outer wall to another side of the outer wall;
wherein the first and third plurality of grid members are positioned or oriented the same way across the lumen, thereby creating longitudinal mixing channels and transverse openings in the lumen relative to the first, second and third plurality of grid members;
wherein the first and second manifolds each include one or more wedge members that are distinct from the grid members and are located at outermost grid members, at ends of the internal mixer section, to provide support to the outermost grid members.

2. The assembly of claim 1, wherein the first, second and third plurality of grid members each include five grid members.

3. The assembly of claim 1 further comprising a housing surrounding the mixer body.

4. The assembly of claim 1, wherein the lumen is a cylindrical lumen.

5. The assembly of claim 1, wherein the first flow channel is smaller in diameter than the first opening, and the second flow channel is smaller in diameter than the second opening.

6. The assembly of claim 1, wherein the first and second end members are mirror-images of one another.

7. The assembly of claim 1, wherein the mixer body is fabricated at least in part by additive manufacturing.

8. A method for fabricating a static mixer assembly comprising:
providing a mixer body that extends from a first end to a second end, the first end having a first opening and the second end having a second opening, the mixer body including a first end member, a mixer portion, and a second end member, with the mixer portion having an internal mixer section;
the first opening extending inward toward the mixer portion and in fluid communication with a first flow channel, and the second opening extending inward toward the mixer portion and in fluid communication with a second flow channel;
the first flow channel extending from the first opening to a first manifold positioned proximal to a first end of the internal mixer section and the second flow channel extending from the second opening to a second manifold positioned proximal to a second end of the internal mixer section;
the internal mixer section defining a lumen having an outer wall; and
positioning a first, a second and a third plurality of grid members in the lumen, with the grid members of the first, second and third plurality of grid members each extending across the lumen from one side of the outer wall to another side of the outer wall;
wherein the first and third plurality of grid members are positioned or oriented the same way across the lumen, thereby creating longitudinal mixing channels and transverse openings in the lumen relative to the first, second and third plurality of grid members;
wherein the first and second manifolds each include one or more wedge members that are distinct from the grid members and are located at outermost grid members, at ends of the internal mixer section, to provide support to the outermost grid members.

9. The method of claim 8, wherein the mixer body is fabricated at least in part by additive manufacturing.

10. The method of claim 8, wherein the mixer body is fabricated at least in part by a 3D printing process.

11. The method of claim 8, wherein the mixer body is fabricated at least in part by a fused deposition modeling process.

12. The method of claim 9, wherein the mixer body is heat treated after fabrication.

13. The method of claim 8, wherein the mixer body is fabricated at least in part with polyether ether ketone.

14. The method of claim 8 further comprising providing a housing surrounding the mixer body.

\* \* \* \* \*